June 5, 1945.　　　M. H. ITTNER　　　2,377,424
SOAP AND PROCESS OF MAKING SAME
Filed Feb. 4, 1941　　　7 Sheets-Sheet 1

INVENTOR
MARTIN HILL ITTNER
BY
Trenton Meredith
ATTORNEY

Fig.2.

June 5, 1945.  M. H. ITTNER  2,377,424
SOAP AND PROCESS OF MAKING SAME
Filed Feb. 4, 1941  7 Sheets-Sheet 5

INVENTOR
MARTIN HILL ITTNER
BY
ATTORNEY

June 5, 1945. M. H. ITTNER 2,377,424
SOAP AND PROCESS OF MAKING SAME
Filed Feb. 4, 1941 7 Sheets-Sheet 6

INVENTOR
MARTIN HILL ITTNER
BY
Trenton Meredith
ATTORNEY

June 5, 1945.    M. H. ITTNER    2,377,424
SOAP AND PROCESS OF MAKING SAME
Filed Feb. 4, 1941    7 Sheets-Sheet 7

INVENTOR
MARTIN HILL ITTNER
BY Trenton Meredith
ATTORNEY

Patented June 5, 1945

UNITED STATES PATENT OFFICE 2,377,424

SOAP AND PROCESS OF MAKING SAME

Martin Hill Ittner, Jersey City, N. J., assignor to Colgate-Palmolive-Peet Company, Jersey City, N. J., a corporation of Delaware Application February 4, 1941, Serial No. 377,373

31 Claims. (Cl. 252—133)

This invention pertains to the manufacture of soaps of various kinds, and more particularly to various types of soap in solid form, and comprises also processes and means for finishing soaps from intermediate factory products to soap products ready for packaging, sale, and use.

The invention comprises new and improved methods for the manufacture of improved white laundry bar soaps, yellow laundry bar soaps, floating soaps, toilet bar soaps, soaps in finely divided form for packaging in cartons, and even chip soaps and soaps in cream or paste form. It may also be used for working the different types of soap substitutes, comprising sulphates and sulphonates, into different usable forms, such as bars, chips, granules, pastes, creams, etc.

While the invention involves the use of practically all known classes of soap-making raw materials it is primarily directed to new and improved methods for interacting these and for working the products thus made into useful finished forms.

A great variety of soap-making processes have been proposed, some of which have been used. In order to understand the present invention, the quite different essential features of these prior processes will be pointed out so that they may be contrasted with the essential features of the invention. Soap solidified in various ways, including the use of refrigeration, has been extruded with and without stirring from nozzles with the aid of hydraulic pressure or high pressures otherwise applied. Soap in fluid condition has been extruded and subsequently chilled. Soaps heated to temperatures above their melting points have been chilled in molds to solid form and then cut into bars.

In contrast with all the different soap-making methods which have been used heretofore, the present invention comprises taking advantage of a critical range in temperature for soaps and soap-like products which lies below the temperature at which a soap is completely molten and "free-flowing," and above the lower range in temperature below which a soap or soap-like product becomes substantially rigid, so that new and more efficient methods of bringing about homogeneity and smoothness of product are thus made available, and so that new and improved products may thus be produced.

A more specific embodiment of the invention comprises employing a soap with some desired, controlled water content at a temperature at which it will be in a molten condition, preferably at a temperature such as will cause it to be not only molten but also "free-flowing," as I have hereinafter defined this term, and subjecting said soap to a high degree of positively induced turbulence in a confined passageway through which the turbulent soap is moved and subjected to progressive controlled cooling whereby the efficiency of the cooling, is increased by substantially continual positively induced turbulence while at the same time the soap is subjected to the most intimate mixing and emulsification, whereby a maximum degree of physical homogeneity may be reached and maintained during the cooling of the soap. The controlled cooling and induced turbulence are continued until the soap has been cooled down to and definitely below what I define as its "free-flowing point," into a range of temperature intermediate between the "free-flowing point" and what I define as its "setting point." I prefer to apply this cooling progressively by moving the turbulent soap in a confined passageway so that it will be gradually brought into contact with new cooling surfaces. The movement to the soap may be produced by hydrostatic pressure applied by pumps, or otherwise, to the hot molten soap before beginning to cool it, or may be produced by mechanical means employed to cause turbulence in the soap, or by both. Having ascertained, by means which are hereinafter explained, the "free-flowing point" and the "setting point" temperatures for the soap in question, it is important to continue the turbulence down into the intermediate temperature range lying well between these two points, but to discontinue the employment of any substantial degree of turbulence by the time the temperature of the soap has been lowered quite down to the setting point. The soap may then be extruded in a permanently substantially homogeneous condition through a suitable nozzle by the application of pressure. The temperature of the soap at the time that it is extruded should be appreciably below its "free-flowing point" and advantageously at or slightly above its "setting point" at which temperature it may be extruded with the employment of slight pressure, as for example, in the range of about 5 to 25 lbs. per square inch, although greater or less pressure may be employed, depending on the characteristics of the nozzle and the resistance offered by the cooling apparatus, while at the same time the extruded bar will be firm enough to be uninjured by handling, and not so firmly set as to require excessive pressure for extrusion, which would cause it to suffer shear stresses within the fully set, firmly solidified bar.

In extruding soap products in accordance with the process of the present invention from different types of equipment suited therefor, I have found that each type of equipment possesses certain characteristics peculiar thereto, and that such characteristics may readily be taken into account during actual operation by controlling the conditions employed through suitable pressure and temperature measurements, and correlating these with the appearance of the soap that is being simultaneously extruded. The most important temperature to measure is that of the soap after active turbulence has ceased, just before actual extrusion, where the soap must be somewhat below its free-flowing temperature. This is a good point at which to observe pressure, though pressure may also be observed advantageously at some other point in the passageway through which the soap is being forced. In actual operation, pressure, temperature, and rate of extrusion are directly related to one another and to the appearance of the extruded soap, and with a given product of definite composition the operator will find it advantageous, at first, to use the appearance of the extruded product as a chief guide to establish the optimum operating conditions, after which he will find it easier to regulate the process by controlling the temperature and pressure. In general, even with different types of apparatus, it will be found that the desirable extrusion temperature bears a substantially constant relation to the "setting point" curve for the product, as illustrated by the unbroken line of Fig. 1, and is reasonably close thereto. An intimate, cold mixture previously made may be heated up to its intermediate range of temperature between its "free-flowing" point and its "setting" point where, with or without further stirring and cooling, it may be extruded.

The present invention also provides means for and a method of controlling the aeration of soap in an accurate manner which has special advantages in connection with continuous production of floating soap. Heretofore the common practice in making floating soap has been to aerate kettle soap while at a sufficiently high temperature to cause it to be in molten, free-flowing condition and to frame the soap thus made and allow it to chill to a solid block which was then cut up into individual cakes for pressing. Although methods have long been known for proportioning and mixing the flow of two or more liquids, so far as I am aware no satisfactory method has been developed heretofore for adding a definite, desired proportion of gas to a viscous liquid like soap and automatically controlling the amount of gas added by the quality of the product.

The present invention, which is a continuation-in-part of my former application Serial No. 346,534 filed July 20, 1940, provides novel means for and a new method of adding gas, preferably continuously, to a viscous liquid such as soap, substantially simultaneously proving whether the gas thus added is the desired amount, or more, or less, and, if more or less, approximately how far the addition of gas departs from the desired amount, and controlling the amount of gas added with result that the desired addition of gas may be made accurately and continuously. I have explained in my former application (Serial No. 346,534) that floating soap under substantially atmospheric pressure at and above its melting point will flow freely enough so that when run into a mold or frame it will level off and run together so that on cooling it will give a compact mass, and that there is an intermediate range of temperature in cooling during which the soap is partially molten, at which time it offers resistance to movement unless impelled by a sufficient degree of force. Such a molten soap on cooling below its complete melting point begins to assume a condition of "setting" as it enters this intermediate range of temperature, and becomes sufficiently rigid at about 2° or 3° C. below its melting point completely to lose a tendency to flow except when impelled by force, and the temperature at which it becomes almost completely set may be on the order of 5° or 6° C. below the melting point, or free-flowing point, for a soap with approximately 30% water content. At the point at which a soap chilling from a molten condition becomes almost completely set there is a sharp increase in the resistance it will offer toward being impelled forward in a conduit. If at this temperature, or at a slightly higher temperature, or even at a slightly lower temperature under somewhat higher pressure, the soap is no longer subjected to stirring but only to pressure, and forward movement is thus induced by an impelling pressure, the set is not destroyed, and if the soap is extruded in this condition a smooth bar is obtained substantially uniform in composition and texture.

This is a new and improved method of finishing soap into bar form. The practice of making milled soaps by rolling solid soap into ribbons between rollers of soap mills and compressing them, still in solid form, with the employment of great pressure exerted by a powerful screw, as with the employment of a soap plodder, and extruding the compacted soap with pressure, still in solid form, through a warm or heated nozzle, is an entirely different process. That process is not suitable for making floating soap as the milling substantially deaerates a floating soap. A floating soap, moreover, even if introduced into a plodder in solid form at a temperature well below its setting point, would be stirred into a non-coherent mush-like condition which is unsuitable for ordinary sale or use.

Although, for purposes of illustration, I have referred more particularly to soaps having about 30% water content, which is close to the average for ordinary kettle soaps, soaps with appreciably higher and with appreciably lower water content than 30% may be used. A soap made by the "settled soap process" from about one part refined cocoanut oil and two parts prime tallow will contain about 30% water and will be molten as a substantially free-flowing liquid at atmospheric pressure at about 60° C. The proportion of cocoanut oil to tallow may be varied appreciably without greatly changing the physical properties of such a soap, also other fats may be used. Soaps that are substantially completely anhydrous are molten and free-flowing at about 290° to 300° C., and such soaps on chilling thicken and set so they become quite thick and viscous, and non-free-flowing, at slightly lower temperatures. I have found that soaps having otherwise similar compositions but varying in their water content between about 30% water and anhydrous soap have intermediate melting temperatures, and somewhat lower intermediate temperatures at which they set or begin to assume concrete form on cooling from a molten condition, as illustrated in Fig. 1.

It will be seen as the disclosure is unfolded that the invention is very wide in its scope and that it furnishes ways and means whereby materials, seemingly quite different in their nature, may be employed advantageously to manufacture finished articles of a like character and common usefulness, or alternatively for making articles which are apparently quite different and suited for varied uses.

Better to understand the invention in its various parts, reference may be had to the accompanying drawings.

Figures 1, 3, 4, 5:
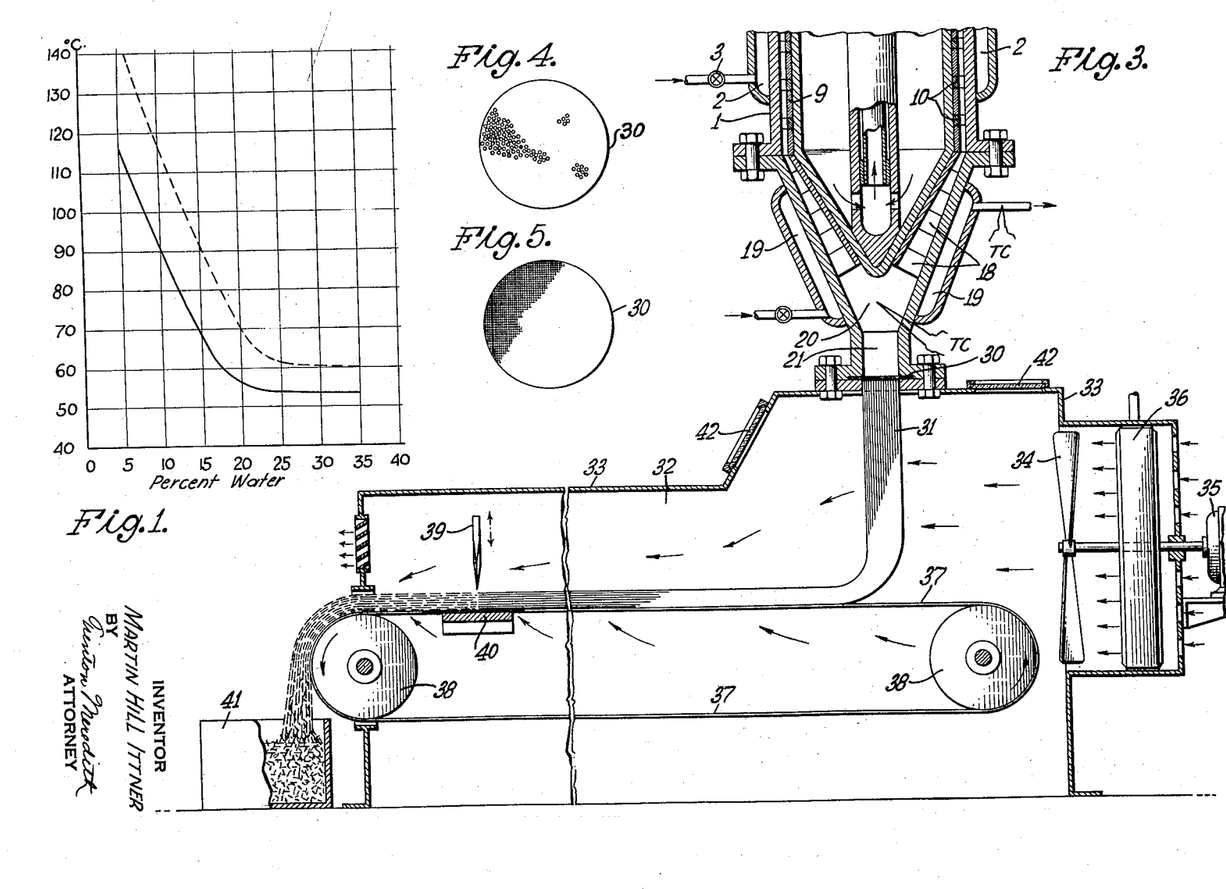
Fig. 1 shows two curves drawn to the same scale of temperature to water content and represents approximately the relation existing between the "free-flowing" temperature and the "setting" temperature of certain soaps.
Fig. 3 is a vertical sectional view of an apparatus in which soap may be cooled somewhat below its melting point and extruded through a plurality of orifices.
Fig. 4 is a perforated plate for use in the nozzle of an apparatus like Fig. 3.
Fig. 5 is a wire screen nozzle for use in connection with the device of Fig. 3.

Fig. 1 is a composite or summation of a large amount of data in diagrammatic form, gathered experimentally on a wide variety of commercial soaps and soaps in various stages of manufacture. In Fig. 1 the unbroken line represents approximately the relationship between water-content in certain soap and a corresponding "setting point" temperature for the same soap while chilling from a molten condition. Most of the data on which this curve is based for water contents below 30% were gathered from experiments on soaps such as are commonly used in the manufacture of toilet soaps and floating soaps, while many of the data pertaining to soaps with over 30% water content were obtained from various types of household bar soaps, including soaps containing soap builders and soaps with rosin content. The unbroken line is an approximate average of various soaps tested, comprising soaps with varying compositions, but nevertheless represents with a fair degree of accuracy the behavior of a wide variety of soaps in chilling from a molten condition to a fairly definite setting point temperature which is approximately the most desirable extrusion point. The temperature ordinate of this curve represents approximately the temperature at which a certain soap will just extrude or cease to extrude through a certain small nozzle when subjected to about 8 lbs. per square inch pressure. This substantially fixed pressure was selected for the "setting point" tests as being in a range that is easily obtainable, one not apt to cause distortion in the soap that is being extruded, yet low enough to require a temperature distinctly in the setting range that lies a few degrees below the melting point or free-flowing point. The broken line represents the temperature at which a given soap with a known water content flows comparatively freely from the same small nozzle as that employed in determining the "setting point" when the soap is subjected to about 1 lb. per square inch pressure. This line is more difficult to determine with accuracy than the unbroken line and it also is not a demarcation between two sharply defined states. The pressure selected for its determination is subject to some extent to individual judgment. The broken line nevertheless represents closely the temperatures at which soaps with certain water contents become "free-flowing." It is to be understood that for any given soap with definite water content, extrusion of cooled soap through a nozzle may be obtained at somewhat lower temperatures than indicated by the unbroken line in Fig. 1 by employing much higher pressures, but these are not to be generally recommended. It is undesirable to use higher pressures at temperatures that are quite below the point at which the soap acquires the proper set in the first degrees in cooling from a molten condition, as these high pressures at temperatures much below the complete setting point cause shear strains in the soap, resulting in cleavage surfaces which at these low temperatures can no longer be welded together by temperature set, and are only partly welded by high pressure, leaving the product less homogeneous and cohesive than that produced by temperature set.

It is to be understood that practically all commercial soaps are mixtures of soaps varying more or less in their several chemical and physical properties, and that these several ingredient soaps commonly would have, when pure, quite different melting points; also that when these soaps are in a solid condition there is more or less crystalline segregation of one soap from another. For this reason the melting of a commercial soap does not take place within a narrow range of temperature, as does the melting of a pure, stable organic chemical, but is in fact spread over a range of several degrees centigrade. This is probably the main reason for the important critical range of partial solidification which I have discovered lying between what I define as the "free-flowing" and the "setting" points. It is also to be understood that my use of the term "free-flowing point" represents about the low limit of temperature at which a given soap has a certain degree of fluidity, even though at higher temperatures it may possess somewhat more freedom to flow.

The curves which are given in Fig. 1 as representing certain limits of "free-flowing" and of "setting" are the representation of a great deal of data which I have acquired from experiments I have made on commercial soaps having somewhat different compositions, and while these curves may serve as guides to what may be expected in operating on a rather wide variety of soaps, it will be found advantageous for one employing the invention to make the free-flowing and setting point curves for himself for any particular composition he may wish to employ covering the range of moisture content which it is expected will be employed.

Figures 6, 7:
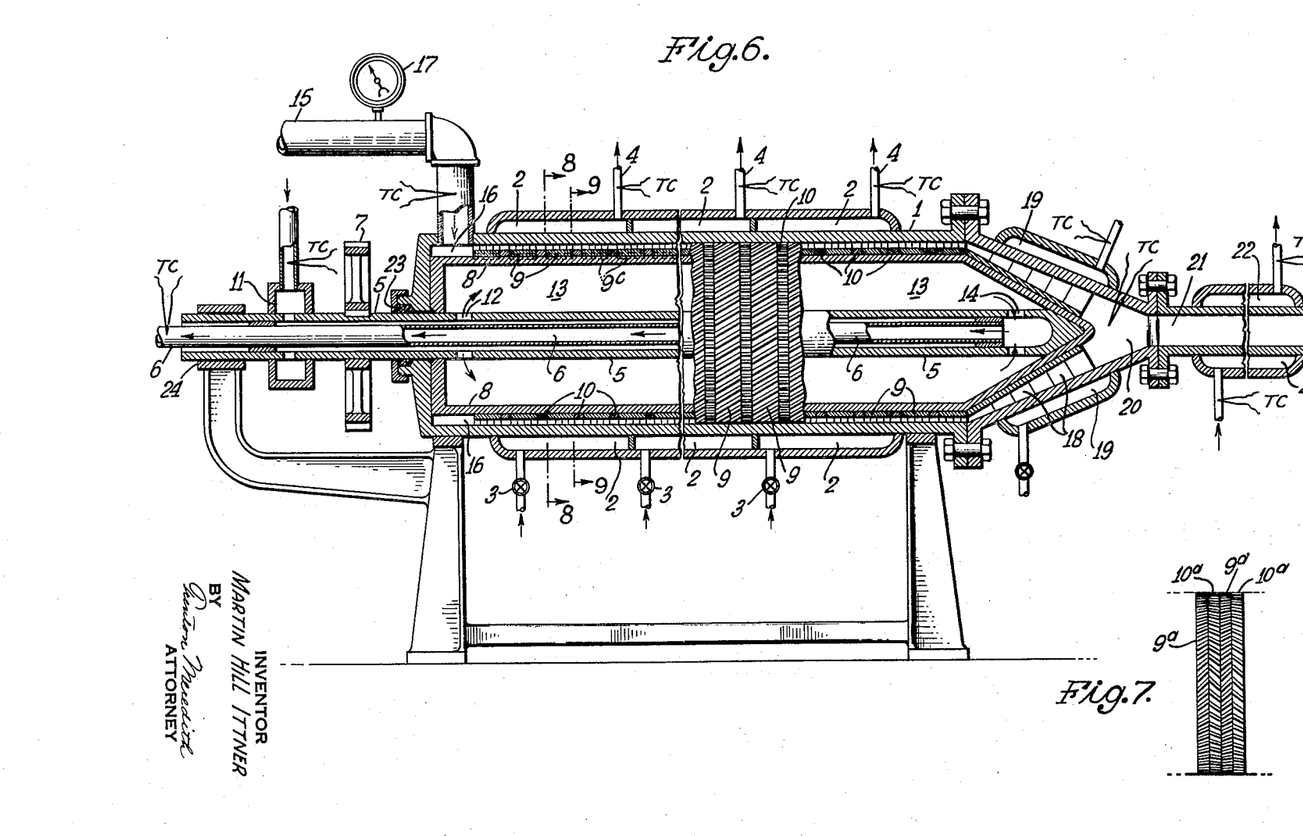
Fig. 6 is a sectional view of a cooling mixer forming part of the invention.
Fig. 7 shows alternative parts which may be used in connection with the device of Fig. 6.
Figure 8:
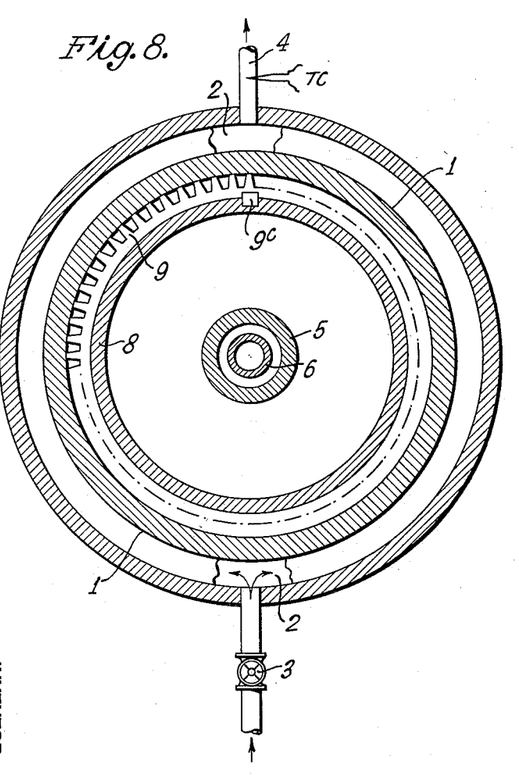
Fig. 8 is a sectional view at 8—8 of Fig. 6.
Figure 9:
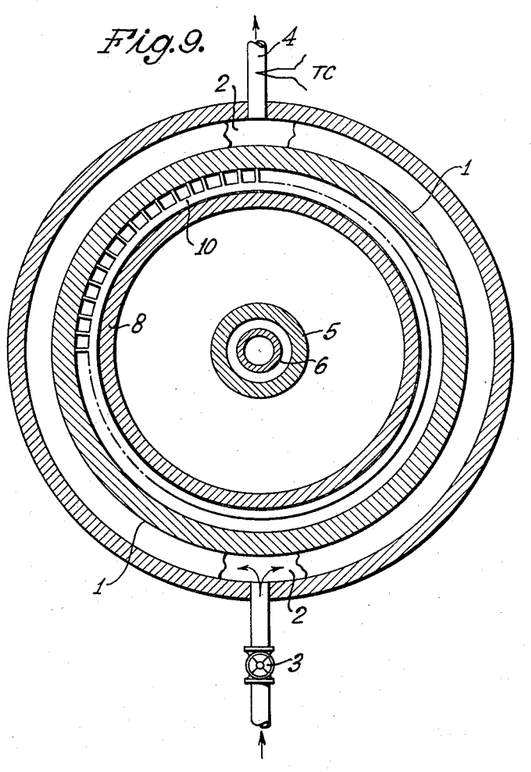
Fig. 9 is a sectional view at 9—9 of Fig. 6.

To get a clearer understanding of the invention, it will be helpful next to follow the operation of the cooling stirrer illustrated in Fig. 6 in which soap is lowered from a "free-flowing" temperature to the intermediate temperature lying between the curves illustrated in Fig. 1. This may be described as follows: The molten soap with all ingredients incorporated therein, though not necessarily entirely in homogeneous condition, is forced by pump or otherwise through pipe 15 past pressure gage 17 and a thermocouple TC into the annular chamber 16 of the cooling stirrer, and is impelled toward its nozzle end 21, passing along the inner surface of wall 1 through spaces between the teeth of gear-like members 9 and 10 shown in Figs. 6, 8, and 9, or alternatively 9a and 10a of Fig. 7, where this type of gear-like members is used to replace those like 9 and 10. Members 9 and 10 have sufficient clearance between them so they may have relative motion to one another instead of turning together. Toothed members 9 are represented as keyed to the hollow revolving drum 8 by keys 9c in Fig. 8, while toothed members 10 are left loose with respect to drum 8 and members 9. The teeth in members 9 and 10 are so constructed that, regardless of their position with respect to one another, the through passageways between the teeth are never materially constricted by their position. This same precaution is observed in making the alternative toothed members 9a and 10a. Toothed members 9, or 9a, have slanting teeth or teeth somewhat similar to those of a helical gear. The teeth of members 10 are shown as non-helical and those of 10a as helical reverse to the slant of members 9a but preferably with different tooth spacings. Revolving drum 8 is attached to hollow shaft 5 which is turned by gear wheel 7 at a desired speed. The direction of revolution of drum 8 and attached toothed members 9 is preferably so that the motion of helical toothed members 9 will tend to impel the soap forward, the force thus imparted being added to the impelling force exerted through pipe 15. The soap forced between the teeth of members 9 will be pushed against the teeth of members 10 in such a way as to cause members 10 to turn in a reverse direction from that of members 9, or at any rate at a relatively slower rate of motion, so that the soap passing from between the teeth of members 9 will be constantly subjected to a change in direction and to a mixing and shearing action in passing into the space between the teeth of members 10. Relative motion between members 9 and 10, or between members 9a and 10a which may be used in their stead, may be provided by applying some type of retarding influence to members 10, or 10a. This can be done by causing these members to fit snugly against the inner side of cylinder 1 or even to be keyed thereto while members 9, or 9a, are free to move, or otherwise. Members 18 may also be provided, as shown in Figs. 3 and 6, to effect additional stirring, if desired, to the soap in its passage toward the free space 20.

In the early part of its passage through the cooling stirrer of Fig. 6, the soap, still molten, will pass with very little resistance, but as it becomes gradually cooled it will become more viscous and more intimately emulsified and homogenized. Cooling will be performed by the inner surface of cylinder 1 with heat conducted to a cooling medium in annular chambers 2 which may be supplied with suitable cooling liquid regulated by inlet valves 3 and the reading of the temperature of the outlet cooling liquid at the thermocouple TC in outlet pipes 4. Cooling effect may also be provided by supplying a cooling liquid through the inlet to annulus 11 between hollow shafts 5 and 6 into the space 13 within drum 8 and finally out of inner hollow shaft 6. This cooling effect may be controlled by the flow of cooling liquid employed and the inlet and outlet temperatures thereof as measured by the thermocouples TC supplied therefor.

It will thus be seen that a proper correlation of pressure on, and cooling of, the soap with the aid of the stirring action of members 9 and 10 will bring about a highly desirable degree of turbulence that will bring about homogeneity at a temperature below that at which there will be any tendency for the homogenized soap to separate into incompatible phases, no matter what the composition may be in a desirable range of composition. It will be found important to regulate the cooling so that, at the time the soap reaches the free space 20 near the nozzle, its temperature as indicated by a thermocouple TC located at this point will be that most suitable for smooth, even, substantially streamlined extrusion into a bar or other shape of desirable smoothness and with shape-retaining consistency. Nozzles of varied shapes and sizes may be employed as desired and they may be provided with suitable cooling means where desirable.

The apparatus represented in Fig. 3 is of especial value in producing a soap of uniform substantially homogeneous quality in finely divided form in the shape of short fine filaments which are substantially dustless. It comprises a cooling mixer, the construction and operation of which is very similar to the apparatus of Fig. 6 and shown in further detail in Figs. 8 and 9, and also as a part of Fig. 2. The apparatus of Fig. 3 is provided with a plurality of small openings or nozzles located in plate 30 and shown in detail in Fig. 4 or Fig. 5. The soap operated on in Fig. 3 is cooled in the cooling mixer with much turbulence to and within the intermediate temperature range between its "free-flowing" point and its setting point, and is extruded while in this range of temperature and preferably at a temperature close to its setting point through a plurality of nozzles as, for example, such as illustrated in Fig. 4 or Fig. 5, to form-retaining filaments of soap 31. These may most advantageously be extruded downwardly into a drying chamber 32 through which hot dry air is circulated by fan 34 after passing through heater 36. Filaments of form-retaining soap 31 produced in this way, especially after slight drying, are very tenacious and have very little tendency to adhere to one another when not subjected to pressure. The partly dried filaments falling on conveyor belt 37 which is preferably of open construction for drying purposes, become further dried in their passage through chamber 32 and completely solidified. The filaments, which may be made of any desired diameter, after drying to a desired amount of moisture, may be cut by cutter 39 to desired lengths giving preferably a product consisting almost exclusively of short lengths which are thus substantially dustless. Drying chamber 32 is enclosed by walls 33 provided with sight glasses 42, while fan 34 is activated by motor 35, and belt 37 is carried and driven by rolls 38, passing over support 40. The finished product of desired size and with a desired degree of dryness may be discharged from dryer 32 to hopper 41 from which it may be supplied to suitable packaging.

Figure 2:
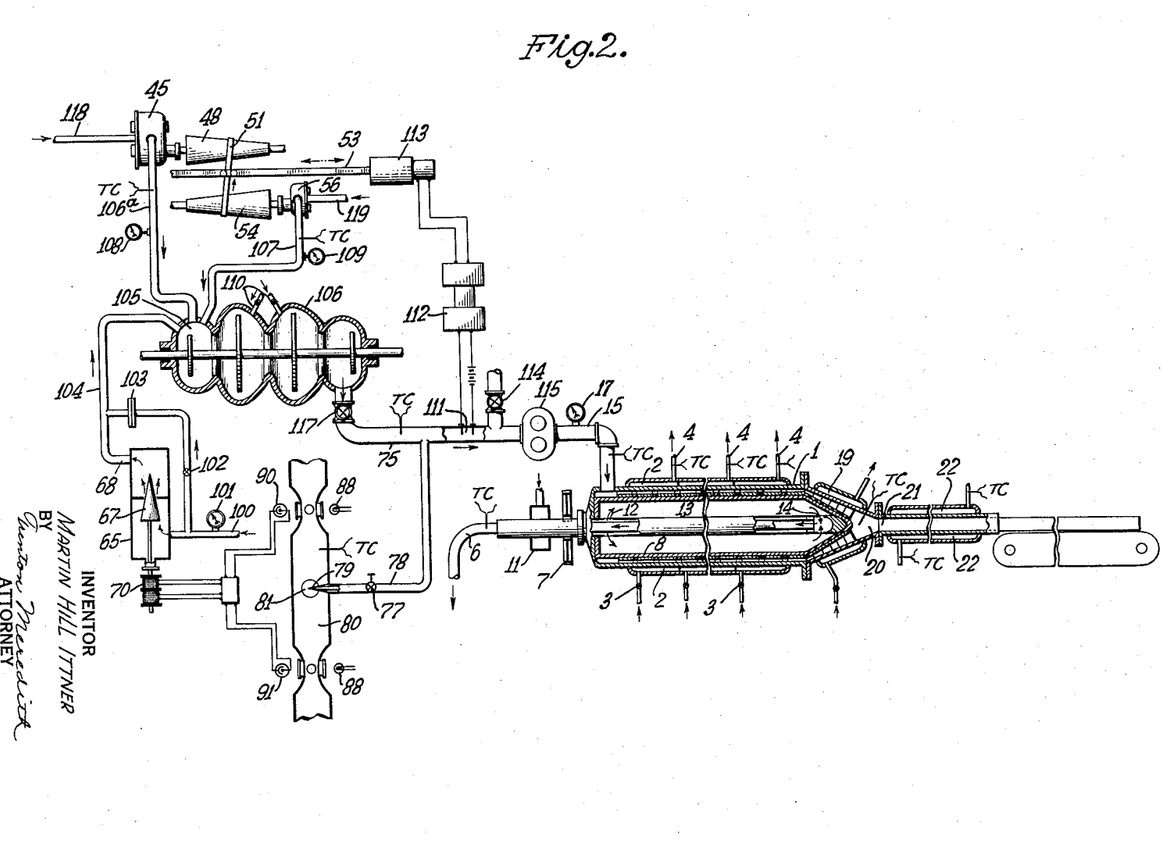
Fig. 2 is a diagrammatic representation of a composite, partly sectioned, layout suitable for the practice of the invention.
Figure 10:
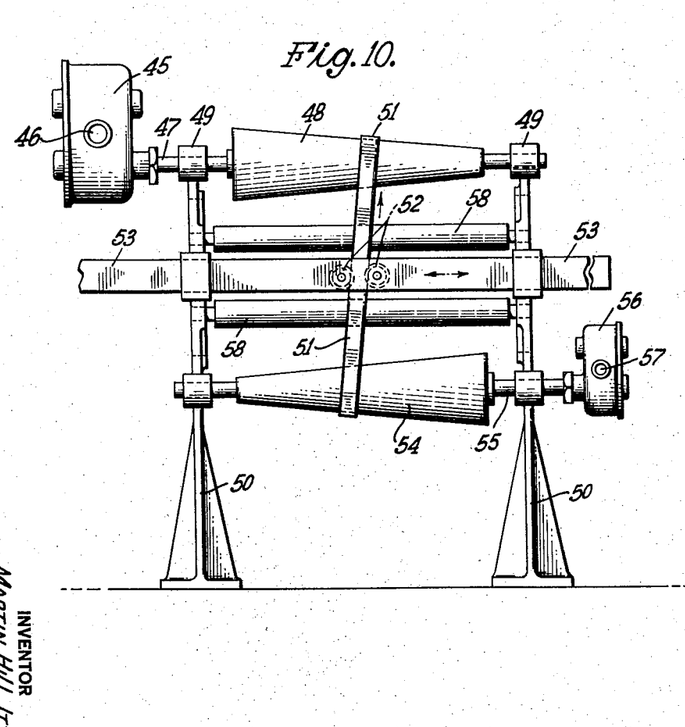
Fig. 10 is a diagrammatic representation of a device for regulating and maintaining a proportional flow between two liquids.
Figure 11:
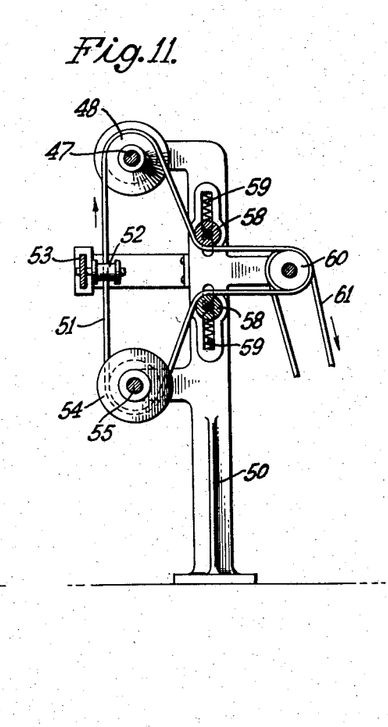
Fig. 11 is a side view partly in section of the device of Fig. 10.

Though various methods of properly proportioning component ingredients are known, and I may use any suitable method and means, it will be found that the mechanism illustrated diagrammatically in Figs. 10 and 11 and also illustrated in Fig. 2 comprises principles and means very suitable for such proportioning as applied to liquids which require delicate adjustment of their proportions. Two pumps 45 and 56, proportioned in size and capacity to approximately the most desired proportion of the two liquids they are to deliver, are connected through parallel driving shafts 47 and 55 to equiangled reversed cone pulleys 48 and 54 connected by a belt 51, driven by activated cylindrical roller pulley 60, which is maintained under tension by roller pulleys 58 and springs 59. The shafts and pulleys are suitably mounted on stand 50. A shifting bar 53 which may be moved in either direction parallel to the axes of the cone pulleys carries two "frictionless" guide pulleys 52 contacting the two edges of belt 51 so that a movement of the bar 53 in one direction will shift the belt along the cone pulleys 48 and 54 so as somewhat to increase the revolutions of one cone pulley and correspondingly lessen the revolutions of the other, and conversely, a movement of bar 53 in the reverse direction will reverse the change in the relative numbers of revolutions of pulleys 48 and 54 and at the same time correspondingly change the relative speeds of pumps 45 and 56. This change in the relative capacities of the two pumps, by increasing one and simultaneously reducing the other, and vice versa, may be performed substantially instantly as needed, and to the required degree. The shifting of bar 53 is preferably performed automatically and its operation is illustrated in Fig. 2.

Figures 12, 13, 14, 15:
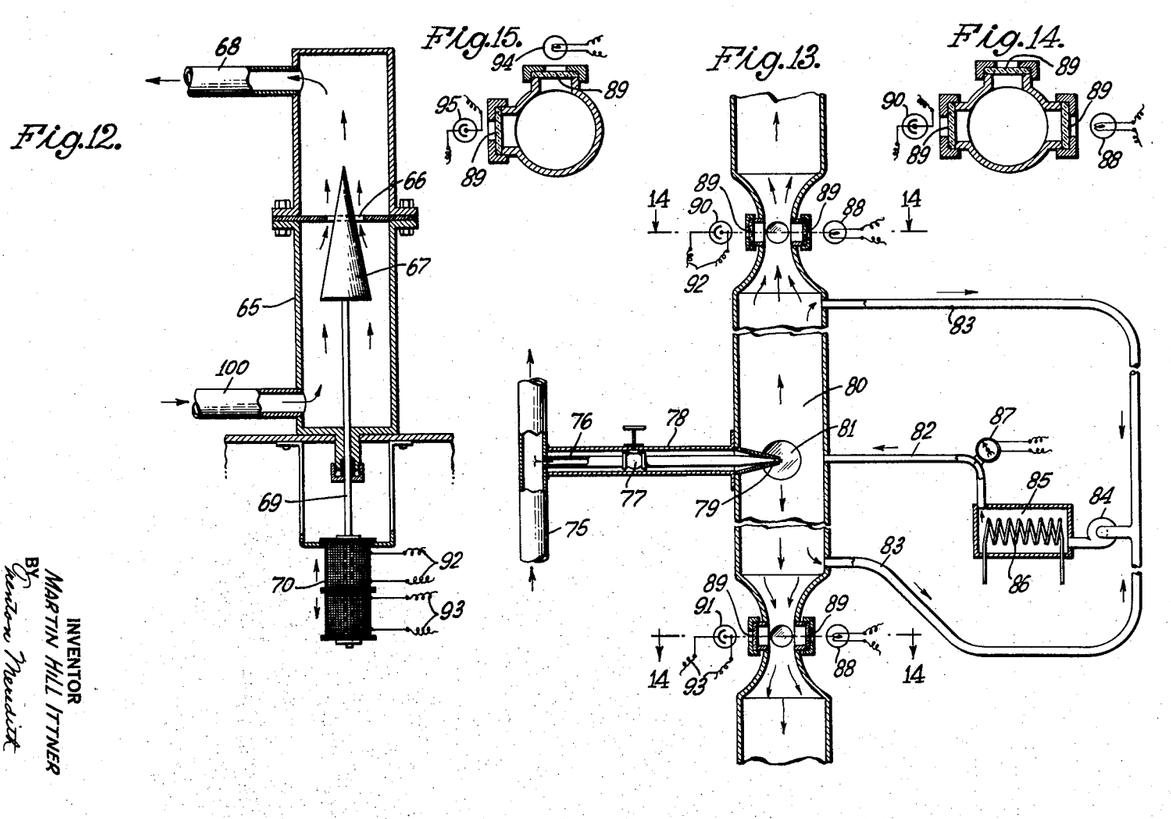
Fig. 12 is a diagrammatic view, partly in section, of an electrically operated air valve regulated in part by the mechanism illustrated in Fig. 13.
Fig. 13 is a diagrammatic view, partly in section, of a device to be used in connection with an electrically operated air valve.
Fig. 14 shows diagrammatically an enlarged sectional view of the device of Fig. 13 at sections 14—14.
Fig. 15 shows diagrammatically an alternative enlarged sectional arrangement of the device of Fig. 13 at sections 14—14.

Fig. 2 is a composite apparatus diagrammatically shown which is suitable for use in the manufacture of floating soap and other soap products of the invention. Suitable fatty acids are fed through pipe 118 to pump 45 and thence through pipe 106a to mixer 106 while, solution of pure caustic soda of suitable concentration is fed to pump 56 through pipe 119 and thence through pipe 107 to mixer 106, the amounts of these being proportioned closely to their chemically equivalent amounts by the common adjustable drive operating said pumps and controlled by movable bar 53 and its controlling electrical mechanism 111, 112 and 113. Caustic soda of any desired concentration may be used and may be, for example, 40° Baumé, in which case if the fatty acids employed are about 30% from cocoanut oil and 70% from tallow, the soap so made will contain about 25% water in the absence of other weighty added material. A soap with more or less water than this can readily be produced. In providing the supply of fatty acids and caustic soda it is important to regulate the temperature of these to within comparatively narrow desirable limits, bearing in mind at the same time that there is also a definite amount of chemical heat of formation, all to the end that the temperature during and after mixing shall be in the range of a "free-flowing" soap as illustrated by the area above the broken line in Fig. 1, in order that the mixing during the chemical reaction shall be properly favored. The fatty acids under the pressure indicated by gage 108 and caustic soda under pressure indicated by gage 109 are delivered into the primary mixing chamber 105 of an efficient mixer 106. The temperatures of both fatty acids and caustic soda solution are measured by thermocouples TC and automatically recorded. Perfume or other desired additions may be supplied regularly in proper amounts through inlets 110. In making a floating soap an ample supply of air under pressure indicated by gage 101 is provided by pipe 100. Air in slightly insufficient amounts is conducted directly through control valve 102 and orifice 103 via pipe 104 to mixing chamber 105, thus providing a continuous means of aerating the soap as formed. A further amount of air is added through device 65 and adjusting valve 67 which is so controlled electrically as to insure that the total air added to the soap will cause the aerated soap to have continuously a desired specific gravity. Mixer 106 is normally full of turbulent soap, and air other than that introduced through pipe 104 is excluded. Valve 117 is normally open when mixer 106 is in operation. If desired, a separate or auxiliary supply of soap or suitable materials may be introduced through valve 114. The soap formed in mixer 106, and approximately properly chemically proportioned and with about the desired amount of air, is forced forward through pipe 75. A small flow of this soap may be tapped off and maintained through jacketed pipe 78 and valve 77, as illustrated in Figs. 2 and 13, and released continuously as tiny droplets through fine tip nozzle 79 into vertical chamber 80 which is kept full of a comparatively inert liquid such as kerosene which has little or no solvent power for soap at ordinary temperatures. The kerosene or other liquid employed is adjusted in specific gravity until it is of substantially the same specific gravity that is desired for the unpressed floating soap at about room temperature. In this way little droplets of soap entering the liquid in vertical chamber 80 will sink if the soap is heavier than the liquid, and will rise if it is aerated so as to have a lighter specific gravity than the liquid. The temperature and consequently the specific gravity of the liquid is maintained by a gentle circulation through pipes 83 by pump 84 and is cooled to a fixed desired temperature by cooling means 86 thermostatically controlled, before returning by pipe 82 to chamber 80, as shown in Fig. 13. Chamber 80 is furnished with two sight glasses 81 so positioned as to observe the formation of the soap droplets from tip 79 so that adjustment may be made from time to time if required or desired. When the soap is not sufficiently aerated the droplets will fall through the liquor and, as they pass the windows in the constricted part of the tube, will shut off some light passing from light source 88 through windows 89 in the lower part of chamber 80 and thus affect the photoelectric cell 91, setting up a suitable change in electrification through leads 93 to reset the air valve 67 to permit more air to enter through valve 67. Means, not shown, may be provided occasionally to flush out liquid chamber 80, removing and preventing any accumulation of soap. The time will thus come, with gradual openings of supplementary air-valve 67, when slightly too much air will be added to the soap. At this time the soap will rise slowly in the liquid in chamber 80 and activate a photoelectric cell provided in the upper part of chamber 80 which will gradually close air-valve 67 by current activated by the electric effect set up in leads 92. The arrangements of the air-controlling device shown in Fig. 2 and in Figs. 12 and 13 are the same in principle and substantially the same in arrangement. Fig. 14 shows an enlarged section of the apparatus of Fig. 13 at 14—14.

A modification of the possible arrangement for the activating photoelectric cell is shown in Fig.

15 in somewhat enlarged form in section taken at 14—14 of Fig. 13. With this arrangement, light from source 94 will be reflected upon photoelectric cell 95 through windows 89 when the reflecting surface of a soap droplet passes by, thus activating the photoelectric cell 95 by reflected light and causing automatically the proper shift of supplementary air-valve 67.

Soap properly aerated and approximately of proper chemical composition passes electrodes 111 of Fig. 2, through which, and through the soap formed, an electric current passes continuously. Changing compositions of the moving soap stream will affect the electrical resistance of the soap between electrodes 111, or conversely the conductivity of the soap, thereby changing the current flow through the circuit which includes suitable electrical devices and amplifiers located at 112 and 113 to activate the bar 53 to increase the flow of fatty acids slightly and decrease the caustic soda, when necessary, and to lessen the flow of acids and increase the caustic soda as necessary to maintain the desired electrical resistance between electrodes 111 or, what is equivalent, maintain the desired quality of the soap.

Figure 16:
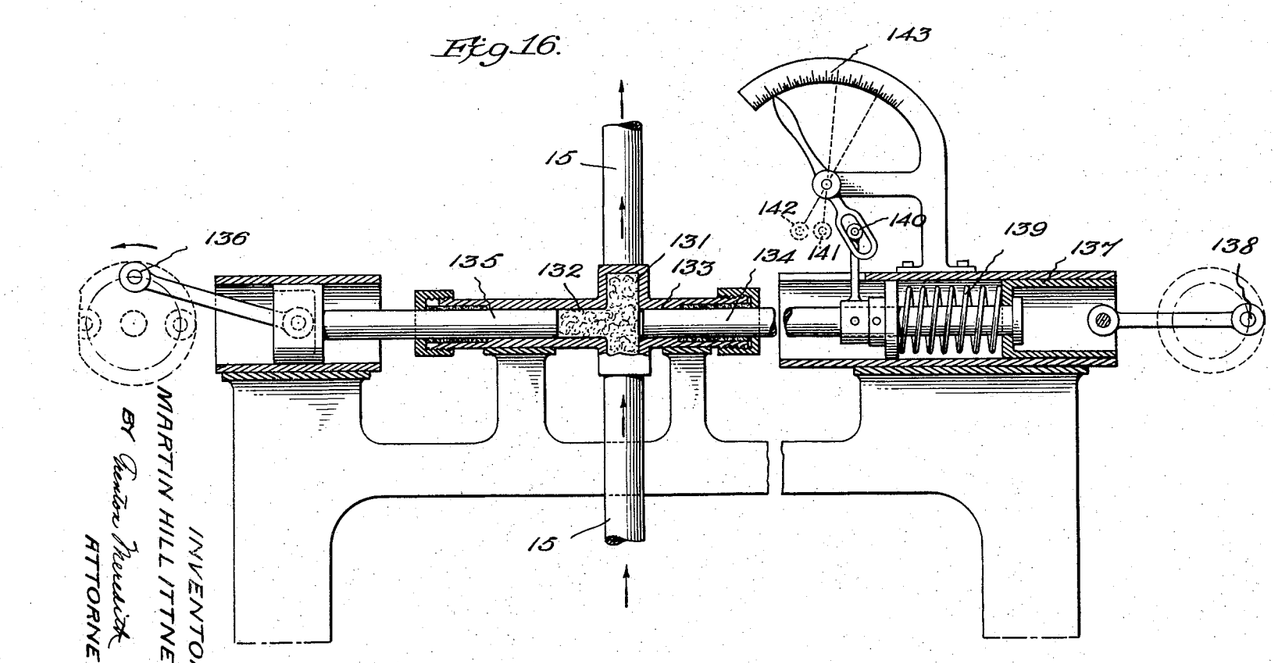
Fig. 16 shows a device for measuring and controlling relative degrees of aeration of a fluid aerated soap in process of manufacture.

In accordance with the present invention, a stream of air in controlled amount may be fed into a stream of molten soap as, for example, in the first chamber 105 of an enclosed mixing machine 106, as shown in Fig. 2, so that the soap and air will become intimately mixed in passage through the machine and conduit 15 shown in Figs. 2, 6 and 16.

Fig. 16 illustrates a means for simply and accurately controlling the degree of aeration of the soap as desired. The aerated soap may be conducted through conduit 15 at substantially constant temperature and pressure, the pressure being controlled by the driving head and resistance imposed to the discharge of the soap that passes through the conduit. In the conduit 15 conducting the aerated soap, I may make a slight enlargement 131, to opposite sides of which I attach cylinders 132 and 133 having equal diameters and the same axis of rotation so that a piston or plunger 134 operating snugly in one cylinder may be forced through the enlargement 131 in the conduit into the opposing cylinder 132 which it will also fit snugly. The plunger 135 in one of these cylinders 132 may be moved by a crank mechanism so that at one throw of the crank 136 the cylinder will be completely emptied by the plunger 135 and at the opposite throw of the crank 136 a cylindrical chamber will be formed with a depth equal to twice the radius of the crank 136. The cylindrical chamber thus formed will be emptied and filled with aerated soap passing through the conduit 15 with every complete revolution of the crank 136. The opposite cylinder 133 is fitted with a plunger 134 that may pass through the enlargement 131 in the soap conduit 15, without obstructing the flow of soap therethrough, and enter the first cylinder 132 at the time that it is completely full of aerated soap, exerting a controlled substantially uniform pressure on the aerated soap and compressing it, and penetrating this cylinder to a measured degree, the depth of such penetration being proportional to the amount of air incorporated in the aerated soap at that time. If the soap is free from aeration, the plunger 134 will not enter the cylinder 132 at all as liquids are substantially non-compressible at ordinary pressures, and, on the other hand, if the soap is highly aerated, the penetration of the plunger 134 into the cylinder 132 filled with aerated soap will be considerable and will be a measure of the degree of aeration of said soap. I may construct this compression plunger 134 with another plunger 137 connected to it which I actuate by means of a crank 138 or otherwise, transmitting pressure from the directly actuated plunger 137 to the compression plunger 134 through a rather heavy compression spring 139, and timing the motion of the directly actuated plunger 137 so that at one throw it will cause the compression plunger 134 to pass through the conduit enlargement 131 and enter the opposite cylinder 132 at a time when crank 136 is at its farthest throw and cylinder 132 is full of aerated soap, and exert a pressure thereon which is that transmitted to the compression plunger 134 through a stiff spring 139. Withdrawal of the compression plunger 134 is followed by the action of the opposite plunger 135 in discharging the aerated soap from cylinder 132 so that a new lot may be drawn in and compressed and tested in the same way when desired, all of which may be performed manually or automatically. The use of the above-mentioned compression spring 139 furnishes a yielding cushion to the compression plunger 134 so that, even if at any time the soap being tested were not aerated, no harm would be done to the mechanism. It can be seen that with different degrees of aeration there will be different degrees of yielding and different degrees of compression of the aerated soap in cylinder 132 and that the amount of compression is a direct measure of the amount of aeration of the soap passing through conduit 15. This will be so, even though under varying conditions the above-mentioned spring 139 will offer varying resistance to compression, the important point being that at any desired degree of aeration, the compression of spring 139 and aerated soap in cylinder 132 will be a substantially constant amount, and variations in either direction will furnish a positive guide to the necessity of increasing or decreasing the degree of aeration of the soap passing through conduit 15, to obtain a uniform desired result, and these increases or decreases in the supply of air may be controlled and activated manually or automatically by the degree of compression suffered by the aerated soap. The degree of penetration of plunger 134 into the aerated soap contained in cylinder 132 may be recorded, or indicated directly or indirectly by any suitable means, as by a pointer moving along a scale 143, the pointer being activated by a roller 140 moving back and forth with plunger 134 to different positions, as 141 and 142.

The soap properly composed and aerated to a desired degree is taken from pipe 75 by pump 115 and passed into pipe 15 and cooling mixer 1. The speed of pump 115 may be regulated by a variable speed drive, not shown and the pump may be provided with a known type of by-pass to prevent excessive building up of pressure in the cooling mixer.

The soap entering the cooling mixer is generally at first slightly above its free-flowing point. As it becomes cooled toward its setting point, with a proper air content and with the aid of a high degree of turbulation, the tiny air particles are beaten smaller and smaller and manifest no tendency at this temperature to reunite. As long as any agitation or turbulence now employed is confined to the temperature range lying between the "free-flowing" and "setting" limits, as illustrated in Fig. 1, only desirable emulsification, homogeneity and smoothness will be imparted to the product. Substantially streamlined extrusion of the product in this condition is very desirable.

It should be understood that my new process of soap-making is not confined alone to soap compositions that melt to a single phase of completely fluid soap of uniform liquid composition, but that it comprises also compositions which at certain raised temperatures comprise two or more fluid phases, as for instance molten soap and comminuted air or other chemically compatible gas; compositions comprising two or more liquid phases, as molten soap and immiscible solutions, or partly miscible solutions used in excess, of salts and/or soap builders, as silicates and carbonates and phosphates of soda; also compositions of molten soap, alone or with ingredients hereinabove referred to, with the addition of kerosene or so-called "naphtha"; also molten soap admixed with non-miscible solvents which may be used thus admixed with soap and which, thus used, add a real cleansing value thereto for certain purposes instead of only a psychological or advertising value. It is not necessary in the use of my process that the phases of the several ingredients be completely mutually soluble or completely fluid or completely liquid at high temperatures, for I may advantageously employ therewith molten soap, with or without other fluid admixture, and desirable solid ingredients such as powdered alkali carbonates, or powdered silicate of soda or powdered phosphate of soda, or other desirable solids in solution or suspension. I may also employ suitable soap, partly dried, molten with admixed alcohol, or glycerine, or concentrated sugar solution or the like, preferably with exclusion of air, to obtain a transparent or translucent effect in the extruded product. My process may use molten soap admixed with soap substitutes, such as any of a wide variety of sulphonate salts with detersive or wetting properties that are compatible with soap or alkalies, and even compatible sulphate salts that possess desirable detersive or wetting characteristics; and the process is applicable to these soap substitutes even without soap, with or without other detersive materials or alkaline builders, provided that one or more of the ingredients of the composition make it sufficiently fluid when heated, and provided that the mixture shows a requisite degree of setting qualities on cooling from a fluid condition, and especially when the tendency to set is gradual over an appreciable range of temperatures rather than resulting in an extremely hard mass with slight cooling.

Soap treated by the invention may have any desirable composition, and will permanently retain all its several ingredients in a state of maximum physical homogeneity in the finished product, even when these several ingredients have great incompatibility for mixing together and are such as will separate from one another when mixed by any hitherto known method of soap-making especially by methods depending upon pouring into frames at free flowing temperatures.

All soaps that are cooled to solidification from a free-flowing temperature without stirring in the intermediate range between the "free-flowing" and "setting" point, are apt to be more or less heterogeneous. This heterogeneity is very marked and troublesome in all hitherto known processes of soap-making in cases where two or more phases are present, and sorely limits the known processes in their applicability to a wide variety of desirable compositions.

In the practice of the invention the entire mass of soap above and down close to the setting point may be moved forward in cooling without offering much resistance to its flow. Thereafter the soap may be extruded through a cooling nozzle which may apply sufficient additional cooling substantially to complete the set, and a bar of solid soap may thus be obtained which possesses unusually desirable properties, such as substantially complete macro-physical homogeneity, smoothness of texture noticeable both in appearance and in use, and substantial freedom from warping with age, even in soaps with comparatively high water content. The method has advantages in permitting the employment of special compositions that would be difficult or impossible to make otherwise.

In making laundry soaps by my method, such as are filled with builders, it is possible to employ better compositions and to get better resulting soaps. Such soaps may be aerated or not, a result that is practically impossible by the old methods of manufacturing filled soaps.

Instead of extruding the cooling near-setting soap into single bars, it may be extruded into a plurality of bars. I may even extrude it into a multiplicity of tiny threads through very small holes in a plate, or quite as readily by interposing a suitable strong wire netting over the outlet. For this purpose I may select a suitable size, as for example a wire net made with rows of parallel wires interwoven at right angles to other rows of wires, with the wires being spaced at 35 mesh, more or less, per linear inch. When making soap in this way I prefer to extrude it downwardly and in the range of temperature and pressure that will yield a multiplicity of tiny, tough, form-retaining threads. If a gentle current of warm dry air is caused to blow against these moving hanging threads, it can be caused to deflect them over and onto an endless open mesh wire belt on which the fine threads may be dried to any desirable degree by suitable means. Soap in this form is quite tough until thoroughly dried. It may be packaged in a vermicelli-like condition or preferably cut to short lengths, or any length desired, before or after drying. It is quite possible by my invention to aerate soap, whether filled or not, to any desired degree, and to extrude it even to these tiny filaments, thereby reducing and controlling the apparent specific gravity of the finished product over a wider range of density or bulkiness than is now possible by known processes. A finely divided product made in this way will have a new structure not heretofore produced and will be substantially devoid of dust and fines and will be very desirable for use for this reason also. Such a soap will have a high degree of solubility, and, when silicate of soda is used as part of its composition, will be substantially free from matter insoluble in water so commonly caused by spraying silicate-containing soaps into an atmosphere with high carbon dioxide content. Soaps made by the process, regardless of composition, possess a remarkable toughness when made and a substantial freedom from undesirable brittleness.

Another great advantage in this type of soap is that it shows no tendency to cake or stick together in the package, or to become dusty even when completely dried.

An illustration of the great flexibility of the invention in adapting unusual, or even ordinarily objectionable, compositions with physically incompatible ingredients to good purpose will give a clearer understanding of some of its exceptional advantages. Soap made by ordinary processes containing as much as about 1% of sodium chloride, or common salt, will to all intents and purposes be an impure soap and possess objectionable qualities because of this impurity and possess no compensating redeeming features. Such a soap in bar form will be of uneven composition and be very brittle. A soap of this kind dried for milling and plodding will not adhere properly to the rolls, will not cohere properly at any time, and will give an objectionable friable product that will break apart in use because of the heterogeneity of the product. In making filled laundry soaps the presence of even less than about 1% common salt in the soap mixture is apt to be very troublesome and to cause the mixture to assume a two phase condition, the soap with certain impurities and in a rough condition forming one phase, and the filling materials and common salt solution forming the other. Such a soap prepared for framing must be crutched at a free-flowing temperature, and even if very thoroughly crutched will separate badly on standing in the frame and give an unsalable product.

In contrast with these soaps containing salt as an objectionable impurity, I find that I can incorporate considerable amounts of salt in soaps made by the invention and that, when the salt is so incorporated, instead of its being an objectionable impurity its presence may add to the good qualities of the soap. For example, I may employ a soap stock made from tallow and cocoanut oil for manufacture of a comminuted soap for packaging in cartons to be devoted to general household cleansing, and in addition to the soap building ingredients generally employed in making such a soap, such as silicates, carbonates, and phosphates of soda, I may also incorporate an amount of common salt equivalent to from less than 1% to appreciably over 5%, and even over 10%, of the weight of the finished product. The salt may be employed dry in a hydrated soap or as a concentrated solution in some cases where an addition to the water content is not an objection. If the salt is added to the molten or hot plastic soap just before entering my cooling mixer, or in the mixer, and if the soap is thoroughly mixed in the intermediate temperature range between its free-flowing point, and its setting point and extruded into a plurality of fine filaments which are cut into short lengths, the product, with or without having been subjected to drying, will dissolve rapidly in water without a tendency to melt together which it might otherwise have, and will possess no substantial lessening of its detersive qualities but in reality an apparent increase thereof due to the greater rapidity and thoroughness with which it will dissolve for use. This greater rapidity and thoroughness of solution is due to the fact that the substantial salt content produces a two phase condition within the portion of soap which is moistened but which has not yet gone into solution, thus destroying any tendency for the wet soap to stick together and delay solution, and the same phenomenon causes the small soap particles to sluff apart with agitation in water and thus dissolve more rapidly. Such a soap in package form, with a content of 5% sodium chloride, will add only about one to three hundredths of one percent of salt to an ordinary solution of the product possessing good sudsing and cleaning properties—an amount of salt free from noticeable effect after solution, though sufficient to increase the rapidity and thoroughness of solution. It is possible in making such a product to subject it at the same time to any desired degree of aeration, thus changing and controlling the bulk of the product, increasing its whiteness and increasing its tendency to rapid solution.

By employing potassium chloride in substantial proportion in place of sodium chloride for mixing with soap by the invention, a new and further advantage is obtained, for there is thus brought about a chemical interaction between the sodium soap and the potassium chloride whereby a substantial amount of potassium soap is formed and a chemically equivalent amount of potassium chloride, is replaced by sodium chloride thus improving the washing qualities of the resulting product while gaining at the same time the additional solution-hastening action of the salt content of the product.

Other salts which are ordinarily considered as physically incompatible with soap mixtures may be employed advantageously for similar or for other reasons. I may thus add 1% more or less of sodium sulphate to a soap composition to improve the whiteness of the product. Sodium sulphate has a tendency to effloresce and become white on exposed surfaces. If a very large amount of sodium sulphate is employed, this surface efflorescence may appear to be objectionable, whereas a properly regulated small amount will improve the surface whiteness of the product without objectionable surface efflorescence.

In my application Serial No. 346,534 filed July 20, 1940, I disclosed several new methods for making soap from fatty acids and carbonated or caustic alkali, which may be all soda or part or all potash, by properly proportioning the ingredients. Most methods of proportioning ingredients for soap-making, such as fatty acids and caustic alkalies, now in use, are really very troublesome and extremely inaccurate and unsatisfactory unless the most scrupulous care is followed in controlling temperatures to within a small fraction of a degree, as well as concentrations within very narrow limits. Furthermore, unavoidable fluctuations in pressure, even when slight, because of resultant fluctuations in flow, have an untoward influence on the final product. The net result of these several imperfectly controlled influences is to produce a soap which at times has an undesirable free fat content and one which quite as often is apt to have too high a free alkali content.

In contrast with these indirect methods of proportioning the fatty material and the caustic alkali, I prefer to employ a direct and substantially perfect means of proportioning these ingredients by substantially continuously automatically testing and controlling the quality of the soap that is made and by employing the quality of the soap as the means of controlling, on the one hand, the addition of relatively less fatty acids and relatively more caustic alkali, when the addition of this latter ingredient is not quite equal to that which is necessary, and, on the other hand the addition of relatively more fatty acids and relatively less caustic alkali when this latter ingredient is present in slightly excessive proportions. This is distinctly a quality control of the proportions of these ingredients and is quite different from and superior to any continuous control that has been used heretofore in soap-making so far as I am aware.

I may use an electrical method for controlling the quality of soap made in my process when carried on continuously. The electrical control may be based on potential differences set up by the soap when the soap so tested contains no caustic soda at one time, or a slight excess, or an objectionable excess at another time. Differences in millivoltage that are produced in this way are a measure of the amount of free caustic soda in a given soap and may be made to activate relays to reduce or increase, to a desired degree, the relative amount of caustic soda in the soap. It may be stated here that a soap containing slightly more or slightly less caustic soda than 0.10% is satisfactory for many purposes. A different standard may be selected as desired.

Another very satisfactory means which I may employ for electrically controlling the quality of the soap, and hence the proportioning of the ingredients, depends upon the changing electrical conductivity of the soap under substantially fixed conditions of temperature, or, in other words, upon the changing resistance to electrical flow which occurs with changes in composition. The soap itself and any dissolved salts, such as sodium chloride, furnish in a given soap stream at a certain temperature a substantially uniform degree of conductivity, whereas an increase in the proportion of hydroxyl ion, as for instance by an increase in the proportion of caustic soda present, will greatly affect the conductivity of the soap stream. It this becomes possible, by providing means for continuously measuring the resistance to an electric current through a portion of the soap stream, to activate by electrical means a control automatically to decrease or increase, as desired, the proportion of free caustic soda in the soap stream.

The invention contemplates making soap products with less than 5% water content and others with over 40% water content, as well as products having water content within the intermediate range lying between 5% and 40%. It has been shown that certain soap products are made with a more or less customary water content, but in spite of custom I may depart considerably in either direction from common standards, with the use of my invention, in order to obtain new and improved products that have not been available by ordinary soap-making methods. I may make soaps with lower water contents by employing less water in the making, or by various methods of drying products containing originally more water than desired. These may be dried in molten form, or in solid form and then melted for further use by my process. A soap that is too dry may be mixed with heat in a confined space within my apparatus with a soap containing more than the desired amount of water, so that an evenly mixed homogeneous product with the desired composition may be obtained which may be finished by the process of the invention. Also a product that is too dry may be brought to a desired water content by incorporation therein of a proper amount of water or of aqueous solution. Such a mixing of water into soap with even incorporation is very difficult by present processes, and, where it can be employed, as in a soap mill, results in an indefinite water content due to simultaneous and indefinite evaporation.

Although I have described the making of floating soaps with considerable particularity, it is to be understood that my invention comprises degrees of aeration far in excess of that necessary to produce a satisfactory floating soap, such as, for instance, those desirable to produce a very bulky product or to add to whiteness by the unusual degree of comminution and even distribution of air thus made possible, and also lesser degrees of aeration, as well as complete freedom from aeration in such other instances, and for such other products, as this may be desirable for any reason.

It should be understood that the invention is not to be limited in its scope to the exact materials, amounts, mechanisms, arrangements, or conditions employed in examples or illustrations, as these are intended only to clarify certain features of the invention but not to limit it.

I claim:

1. In the manufacture of floating soap, the steps which comprise substantially continuously mixing soap and a gas in predetermined proportions, maintaining the mixture under pressure at a temperature substantially between that at which the soap is free-flowing and that at which the soap solidifies on cooling, and promptly thereafter cooling the mixture to substantially form-retaining condition while maintaining substantial pressure on said soap.

2. In the manufacture of floating soap, the steps which comprise continuously mixing soap and a gas in predetermined proportions, cooling said soap while maintaining the mixture under pressure and while subjected to a high degree of turbulence at a temperature substantially between that at which the soap is free-flowing and that at which the cooling soap solidifies, and promptly thereafter cooling the mixture to substantially form-retaining condition while still subjected to substantial pressure.

3. In the manufacture of soap having a specific gravity less than one, the steps which comprise substantially uniformly incorporating in soap sufficient air in finely divided condition to produce a soap having a specific gravity less than one, and automatically controlling the quantity of aeration by the changes in volume of successive portions of said aerated soap due to changes in pressure exerted on said portions of aerated soap.

4. In the manufacture of floating soap containing air in finely divided condition, the steps which comprise substantially uniformly aerating said soap continuously in molten condition at substantially constant pressure and temperature, and controlling the degree of said aeration by the degrees of contraction suffered by substantially equal portions of said aerated soap when subjected to a substantially constant increase in pressure.

5. In the manufacture of soap, the steps which comprise mixing soap and air in predetermined proportions, cooling and maintaining the mixture under pressure at a temperature between that at which the soap is free-flowing and that at which the soap solidifies, while subjecting the mixture to a turbulating action, and promptly thereafter extruding said aerated soap cooled to substantially form-retaining condition.

6. In the continuous manufacture of aerated soap with a controlled degree of aeration, the steps of controlling said aeration by decreasing the degree of aeration of said soap when a portion of said aerated soap cooled to a desired temperature floats in a liquid of a desired standard specific gravity, and increasing the degree of aeration of said soap when a portion thereof cooled to a desired temperature sinks in a liquid of a desired standard specific gravity.

7. In the continuous manufacture of aerated soap with a controlled degree of aeration, the steps of controlling said aeration by decreasing the degree of aeration of said soap when a portion of said aerated soap cooled to a desired temperature floats in a liquid of a desired standard specific gravity, and increasing the degree of aeration of said soap when a portion thereof cooled to a desired temperature sinks in a liquid of a desired standard specific gravity, said controls of said aeration being adjusted by variations in the specific gravity of said soap from the desired specific gravity of said soap at a given temperature.

8. An apparatus for making soap comprising means for introducing gas into soap, means for mixing said soap and gas, means for controlling the temperature thereof, means for controlling the amount of gas introduced into said soap, means for determining the quantity of gas contained in the mixture, means operatively associated with said last named means for regulating said controlling means, and means for extruding the mixture through at least one nozzle.

9. In the process of making aerated soap, the steps comprising adding gas to soap, dispersing said gas in finely divided condition substantially uniformly throughout said soap and controlling the amount of gas added to the soap by the degree of compressibility of the aerated soap.

10. In the process of making aerated soap, the steps comprising adding gas to a stream of soap, dispersing said gas in finely divided condition substantially uniformly across said stream of soap and controlling the amount of gas added to the stream of soap by the density of the aerated soap.

11. In the process of aerating soap to make floating soap containing a desired volume proportion of air to soap, the steps comprising introducing air into a stream of soap, dispersing said air in finely divided condition in said soap, increasing the rate of introduction of air into said stream of soap when portions of said aerated soap subjected to substantially definite change in pressure at substantially uniform temperature suffer changes in volume less than a selected desired amount, and decreasing the rate of introduction of air into said soap when other comparable portions of said aerated soap subjected to substantially similar changes in pressure at substantially the same temperature suffer changes in volume greater than said selected desired amount.

12. In the process of incorporating gas in finely divided condition in soap to obtain a product having a substantially uniformly divided desired volume of gas in a definite volume of said soap, the steps of adding gas to said soap, thoroughly mixing the added gas in said soap and controlling the addition of said gas to said soap so that successive definite test portions of said gas-containing soap subjected to a substantially uniform pressure will suffer a substantially uniform desired change in volume under fixed conditions of temperature when subjected to a substantially uniform change in pressure.

13. In the process of making aerated soap, the steps comprising continuously adding gas to a stream of soap, dispersing said gas in finely divided condition substantially uniformly across the steam of soap and controlling the proportion of gas added to said stream of soap by the degree of compressibility of the aerated soap.

14. In the manufacture of soap, the steps of incorporating air in soap in a definite volume proportion of gas to soap while the soap is molten with the aid of heat, cooling and simultaneously stirring said aerated soap at a temperature below that at which the soap is molten and free-flowing but not substantially below the temperature at which the cooling soap begins to acquire rigidity, and extruding said soap from a confined space while in substantially said temperature range in the absence of further stirring with the aid of pressure through a nozzle to a substantially homogeneous bar.

15. In the manufacture of aerated soap, the steps of incorporating a desired volume of air into a definite volume of said soap in molten condition, cooling and simultaneously stirring the said aerated soap at a temperature below that at which it is molten and free-flowing but not below the temperature at which the cooling soap begins to acquire rigidity, and extruding with pressure said aerated soap cooled to form-retaining condition in the absence of further stirring.

16. In the manufacture of aerated soap, the steps of incorporating air in soap in a desired volume proportion of air to soap while the soap is at a temperature above the temperature at which it begins to acquire rigidity on cooling, stirring said aerated soap in the temperature range below the temperature at which said soap is molten and free-flowing but not below the temperature at which the cooling soap begins to acquire rigidity, and extruding the aerated soap to form-retaining condition with the aid of pressure.

17. In the manufacture of soap, the steps of incorporating gas in molten soap in a definite proportion or gas to soap, cooling and simultaneously stirring said soap below the temperature at which the soap is molten and free-flowing but not substantially below the temperature at which the soap in cooling begins to acquire rigidity, and extruding the soap in the absence of further stirring with the aid of pressure through a plurality of fine orifices into separate filaments of soap.

18. In the manufacture of soap, the steps of bringing soap within the range of temperature below that at which it is free-flowing but not substantially below that at which it begins to acquire rigidity on cooling, stirring the soap while heated within this temperature range, removing the stirred soap to a free space, and extruding the soap from the free space without further stirring in form-retaining shape.

19. In the manufacture of soap in solid form, the steps comprising introducing into soap a modifying ingredient capable of forming at least in part a non-miscible liquid phase with said soap when above the free-flowing temperature, emulsifying said soap with said ingredient with the aid of a high degree of turbulence at a temperature below that at which the soap is substantially molten and free-flowing but not substantially below that at which the soap on cooling acquires rigidity, and extruding said soap with pressure from a confined space without further stirring in substantially form-retaining condition at about the temperature at which it acquires rigidity.

20. In the manufacture of aerated soap, the steps of incorporating air in soap that is heated to a temperature above that at which the soap on cooling begins to acquire rigidity, dispersing said air in said soap by thorough agitation while within the temperature range below that at which the soap is molten and free-flowing but not substantially below that at which the soap on cooling begins to acquire rigidity, and extruding the soap without further stirring from a confined space with the aid of pressure through a plurality of fine orifices into separate form-retaining filaments prior to cooling to rigidity.

21. In the manufacture of aerated soap, the steps of incorporating air in soap that is heated to a temperature above that at which the soap on cooling begins to acquire rigidity, dispersing said air in said soap by thorough agitation while within the temperature range below that at which the soap is molten and free-flowing but not substantially below that at which the soap on cooling begins to acquire rigidity, and extruding the soap without further stirring from a confined space into a form-retaining bar.

22. In the manufacture of aerated soap, the steps of incorporating a desired proportion of air to soap in said soap while molten with the aid of heat, cooling and simultaneously stirring said aerated soap down to and below the temperature at which the soap is molten and free-flowing but not substantially below the temperature at which the cooling soap begins to acquire rigidity, extruding the thus cooled soap in the absence of further stirring from a confined space with the aid of pressure through a plurality of fine orifices into separate filaments prior to cooling to rigidity, drying the filaments to a desired degree and severing the said filaments into desired lengths.

23. In the manufacture of soap containing more than 10% coconut oil soap and at least one of the materials chosen from the class consisting of ethyl alcohol, methyl alcohol, glycerine and sugar syrup, as inducers of transparency, the steps of incorporating said material in said soap in molten condition in a confined space with the substantial exclusion of air, cooling said soap with turbulence below the temperature at which the soap mixed with said material is free-flowing but not substantially below the temperature at which it becomes rigid on cooling, and extruding the soap thus formed with pressure in the absence of further stirring to a form-retaining bar.

24. An apparatus for aerating soap comprising means for introducing gas into soap, means for dispersing the gas through the soap in finely divided condition, means for testing the density of the aerated soap, and means operatively associated with said testing means for regulating the quantity of gas introduced.

25. An apparatus for aerating soap comprising means for introducing gas into soap, means for dispersing the gas through the soap in finely divided condition, means for testing the compressibility of the aerated soap, and means operatively associated with said testing means for regulating the quantity of gas introduced.

26. An apparatus for aerating soap comprising means for introducing gas into soap, means for dispersing the gas through the soap in finely divided condition, means for testing the gas-soap ratio in the aerated soap, and means operatively associated with said testing means for regulating the quantity of gas introduced.

27. In the manufacture of soap compositions, the steps comprising introducing soap and a modifying material comprising at least one ingredient of the class consisting of sodium chloride, potassium chloride, and sodium sulphate into a mixing chamber, emulsifying said soap in said mixing chamber with said material in the presence of moisture with the aid of turbulence at a temperature below that at which the soap is substantially free-flowing but not substantially below that at which the soap on cooling acquires rigidity, said ingredient being used in sufficient amount that the soap composition would comprise two liquid phases if heated above the free-flowing point, and converting said emulsified soap to form-retaining condition.

28. In the manufacture of soap products in form-retaining condition, the steps comprising adding to moisture-containing soap at least one material from the group consisting of sodium chloride, potassium chloride, and sodium sulphate in an amount sufficient, to form a distinct liquid phase with said soap at a temperature above the free-flowing point, intimately and uniformly mixing said soap with said material in the intermediate range of temperature between the free-flowing point of the resulting mixture and the temperature at which the mixture on cooling acquires substantial rigidity, and transforming said mixture into form-retaining condition with the aid of cooling below said intermediate temperature range.

29. The process of making solid soap in particulate form which comprises intimately and uniformly mixing moisture-containing soap at a temperature at least slightly above the temperature at which the soap on cooling from a fluent condition acquires rigidity with at least one soap building ingredient and with at least 1% of material from the group consisting of sodium chloride, potassium chloride, the amount of material from said group being sufficient to cause the soap mixture to comprise two liquid phases if heated above the free-flowing point, and sodium sulphate, forcing said mixture with the aid of pressure through at least one orifice, and converting soap forced through said orifice with the aid of substantial drying into solid soap particles.

30. As a new article of manufacture, soap in particulate form comprising finely divided solid particles of dried soap, said soap comprising at least about 5% of material selected from the group consisting of sodium chloride, potassium chloride, and sodium sulphate, and also comprising at least one soap building ingredient from the group consisting of sodium carbonate, sodium silicate, and sodium phosphate, said material forming a separate phase in said solid soap particles in such fine and uniform dispersion that said dried soap particles possess substantial macro-physical homogeneity and smoothness of texture within said particles.

31. As a new article of manufacture, soap in particulate for comprising finely divided solid particles of dried soap, said soap comprising more than about 1% of material from the group consisting of sodium chloride, potassium chloride, and sodium sulphate, and also comprising building material selected from the group consisting of sodium carbonate, sodium silicate, and sodium phosphate, said materials being in such fine and uniform dispersion in said soap that said dried soap particles possess substantial macro-physical homogeneity.

MARTIN HILL ITTNER.

CERTIFICATE OF CORRECTION.

Patent No. 2,377,424. June 5, 1945.

MARTIN HILL ITTNER.

It is hereby certified that error appears in the printed specification of the above numbered patent requiring correction as follows: Page 1, first column, line 19, after the syllable "terials" insert a comma; and second column, line 1, after "cooling" insert a comma; line 2, after "cooling" strike out the comma; line 18, for "to the" read --of the--; line 34, the word "The" should be the beginning of a new paragraph; page 3, second column, line 39, after "also" insert a comma; page 4, first column, line 73, for "thermocouple" read --thermocouples--; page 5, first column, line 41, for "while," read --while a--; and second column, line 19, strike out "and"; line 59, before the syllable "re-" insert --thus--; page 6, first column, line 25, before "maintain" insert the word --to--; and second column, line 62, after "shown" insert a comma; page 7, first column, line 67, after "making" insert a comma; same line, strike out "by"; line 68, for "free flowing" read --free-flowing--; page 8, first column, line 55, after "point" strike out the comma and insert the same after "point" in line 56; and second column, line 21, after "chloride" first occurrence, strike out the comma and insert the same after "chloride" second occurrence, same line; line 70, after "hand" insert a comma; page 9, first column, line 13, after "soap" insert a comma; line 35, for "this" read --thus--; page 10, second column, line 40, for "or gas" read --of gas--; page 11, second column, line 19, after "sufficient" strike out the comma; line 38, after the comma and before "the" insert --and sodium sulphate,--; lines 41 and 42, strike out the words and comma "and sodium sulphate,"; line 61, for the word "for" read --form--; and that the said Letters Patent should be read with this correction therein that the same may conform to the record of the case in the Patent Office.

Signed and sealed this 11th day of September, A. D. 1945.

Leslie Frazer (Seal) First Assistant Commissioner of Patents.